(12) United States Patent
Zeng

(10) Patent No.: US 10,093,800 B2
(45) Date of Patent: Oct. 9, 2018

(54) POLYPHENYLENE ETHER RESIN COMPOSITION, AND A PREPREG AND A COPPER CLAD LAMINATE MADE THEREFROM

(71) Applicant: GUANGDONG SHENGYI SCI.TECH CO., LTD, Dongguan, Guangdong (CN)

(72) Inventor: Xian-Ping Zeng, Dongguan (CN)

(73) Assignee: GUANGDONG SHENGYI SCI. TECH CO., LTD., Guangdong (CN)

( * ) Notice: Subject to any disclaimer, the term of this patent is extended or adjusted under 35 U.S.C. 154(b) by 784 days.

(21) Appl. No.: 13/845,116

(22) Filed: Mar. 18, 2013

(65) Prior Publication Data

US 2014/0044918 A1 Feb. 13, 2014

(30) Foreign Application Priority Data

Aug. 9, 2012 (CN) .......................... 2012 1 0282796

(51) Int. Cl.
| | |
|---|---|
| *C08L 71/12* | (2006.01) |
| *D06M 15/53* | (2006.01) |
| *C08L 47/00* | (2006.01) |
| *C08J 5/24* | (2006.01) |
| *C08G 65/48* | (2006.01) |

(52) U.S. Cl.
CPC .......... *C08L 71/126* (2013.01); *C08G 65/485* (2013.01); *C08J 5/24* (2013.01); *C08L 47/00* (2013.01); *D06M 15/53* (2013.01); *C08J 2371/12* (2013.01); *Y10T 428/24355* (2015.01); *Y10T 428/31678* (2015.04); *Y10T 442/20* (2015.04)

(58) Field of Classification Search
None
See application file for complete search history.

(56) References Cited

U.S. PATENT DOCUMENTS

| | | | | |
|---|---|---|---|---|
| 5,366,814 | A * | 11/1994 | Yamanishi | H05K 3/384 205/111 |
| 6,306,963 | B1 | 10/2001 | Lane et al. | |
| 7,192,651 | B2 * | 3/2007 | Ohno | C08G 65/485 428/461 |
| 7,413,791 | B2 | 8/2008 | Inoue et al. | |
| 7,582,691 | B2 * | 9/2009 | Peters | C08G 65/485 524/100 |
| 2006/0041068 | A1 * | 2/2006 | Ohno | C08F 290/062 525/191 |
| 2007/0129502 | A1 | 6/2007 | Kawabe et al. | |
| 2008/0254257 | A1 * | 10/2008 | Inoue | B32B 15/14 428/141 |
| 2008/0300350 | A1 † | 12/2008 | Ohno | |
| 2009/0247032 | A1 | 10/2009 | Mori et al. | |
| 2009/0266591 | A1 | 10/2009 | Amou et al. | |

FOREIGN PATENT DOCUMENTS

| | | |
|---|---|---|
| CN | 1280337 | 1/2001 |
| CN | 1745142 A | 3/2006 |
| CN | 102161823 | 8/2011 |
| CN | 102161823 A † | 8/2011 |
| CN | 102807658 | 12/2012 |
| WO | 2006023371 A1 | 3/2006 |

OTHER PUBLICATIONS

International Search Report, PCT/CN2013/072091, dated Jun. 6, 2013.
Australian Patent Examination Report No. 1, Application No. 2013202044, Shengyi Technology Co. Ltd., dated Dec. 23, 2013.
European Search Report, Application No. 13159035.8-1302, Shengyi Technology Co. Ltd., dated Dec. 2, 2013.
Patent Abstract of China, Publication No. CN102807658, Shengyi Technology Co Ltd., Dec. 5, 2012.
Patent Abstract of China, Publication No. CN102161823, Guangdong Shengyi Sci Tech Co., Aug. 24, 2011.
Patent Abstract of China, Publication No. CN1280337 (Abstract of corresponding document: EP1069491), Toshiba Corp., Jan. 17, 2001.

* cited by examiner
† cited by third party

*Primary Examiner* — Shawn Mckinnon
(74) *Attorney, Agent, or Firm* — McDonald Hopkins LLC

(57) ABSTRACT

The present invention relates to a polyphenylene ether resin composition, and a prepreg and a copper dad laminate made therefrom. The polyphenylene ether resin composition comprises: (A) functionalized polyphenylene ether resin, (B) crosslinking agent, and (C) initiator; the component (A) functionalized polyphenylene ether resin is polyphenylene ether resin that has a number average molecular weight of 500-5000 and unsaturated double bonds at the molecule terminal; the component (B) crosslinking agent is olefin resin with a number average molecular weight of 500-10000, of which styrene structure comprises 10-50 wt %, and of which the molecule comprises 1,2-addition butadiene structure. The polyphenylene ether resin composition of the present invention is a composition of functionalized polyphenylene ether resin with a low molecular weight. The prepreg and copper clad laminate made from the polyphenylene ether resin composition have good dielectric properties and heat resistance.

8 Claims, No Drawings

POLYPHENYLENE ETHER RESIN COMPOSITION, AND A PREPREG AND A COPPER CLAD LAMINATE MADE THEREFROM

RELATED APPLICATION

This application claims priority to Chinese Application Serial Number 201210282796.5, filed Aug. 9, 2012, which is herein incorporated by reference.

FIELD OF THE INVENTION

The present invention relates to a resin composition, particularly relates to a polyphenylene ether resin composition, and a prepreg and a copper clad laminate made therefrom.

BACKGROUND OF THE INVENTION

In recent years, with computers and information communication equipments developing toward high performance, high function and networking, to transmit and process large-capacity information at high speed, operation signals tend to be high-frequency. Therefore, the material for circuit substrates is required to be improved, and it has developed rapidly particularly in those electronic devices using broadband network, such as mobile communication devices.

Among the conventional materials used for a printed circuit substrate, epoxy resins with excellent adhesion characteristics are widely used. However, an epoxy resin circuit substrate generally has relatively high dielectric constant and dielectric loss tangent (the dielectric constant is more than 4, and the dielectric loss tangent is around 0.02), and inadequate high-frequency characteristics, which result in failure in meeting the requirement of high-frequency signals. Therefore, it is required to develop resins with excellent dielectric properties, that is, resins having low dielectric constant and dielectric loss tangent. For a long time, technicians in the field have studied thermosetting cyanate esters, bismaleimide resins, hydrocarbon resins, etc., which have excellent dielectric properties. In addition, polyphenylene ether resins, due to having good dielectric properties and heat resistance, are also studied as high frequency, high speed materials by many technicists, but their applications are much limited because of their high melting point and poor flowability, and prepregs made therefrom have high melting viscosity, which can not meet the requirements of the production process of multi-layer printed circuit boards. By reducing the molecular weight of polyphenylene ether resins, the melting temperature can be effectively decreased and the flowability can be effectively improved, but the heat resistance is also impaired.

The Chinese patent application No. CN1745142A discloses a polyphenylene ether resin composition comprising a polyphenylene ether resin containing vinylphenyl and metavinylphenyl at end groups thereof as the matrix resin, isocyanuric acid triallyl ester as the crosslinking agent, and if necessarily also comprising an inorganic filler and a flame retardant. And, a prepreg and a laminate having excellent dielectric properties and comparatively high glass transition temperature are prepared by impregnation of NE type fiberglass cloth in the polyphenylene ether resin composition. However, because the polyphenylene ether composition uses isocyanuric acid triallyl ester as the crosslinking agent which has a comparatively low molecular weight and is easily volatilized in the process of manufacturing prepregs, it is not good for stably manufacturing prepregs and laminates. In the patent application, it is mentioned that besides PPE, if necessarily olefin resins can also be used as compatilizer to improve the heat resistance, adhesiveness and dimensional stability, but studies on various properties of the cured resin are not mentioned.

The US patent application No. US2009/0247032 discloses a resin composition comprising a polyphenylene ether resin having vinyl bifunctionality as the matrix resin, cyanate ether with naphthalene ring structure, bisphenol A type cyanate resin, brominated flame retardant, and an inorganic filler. The resin composition has exceedingly good flowability and good dielectric properties together with extremely good peel strength, humidity resistance and flame retardance.

The PCT patent application No. WO2006/023371A1 discloses a composition comprising a bifunctionalized polyphenylene ether resin and a unsaturated olefin monomer, which can improve the flowability and the performance after curing of polyphenylene ether resin, but in the patent, performance advantages are not be pointed out for using bifunctionalized polyphenylene ether resin in the field of laminates, and the unsaturated olefin monomer used is a compound with a low molecular weight that is also easily volatilized under high temperature to cause poor processability.

In summary, functionalizing the polyphenylene ether with a low molecular weight is a solution to the problem of heat resistance reduction caused by reduction of molecular weight of the polyphenylene ether. However, while being specifically applied to the field of laminates, how to select proper cross-linking is agent and show the performance advantages of the functionalized polyphenylene ether resin still need to be further studied.

SUMMARY OF THE INVENTION

An object of the present invention is to provide a polyphenylene ether resin composition that is a composition of functionalized polyphenylene ether resin with a low molecular weight, which has good processability and keeps the good dielectric properties and heat resistance of the polyphenylene ether resin.

Another object of the present invention is to provide a prepreg and a copper clad laminate made from the above mentioned polyphenylene ether resin composition, which has good dielectric properties and heat resistance.

To achieve the above mentioned objects, the present invention provides a polyphenylene ether resin composition, comprising: (A) functionalized polyphenylene ether resin, (B) crosslinking agent, and (C) initiator; the component (A) functionalized polyphenylene ether resin is polyphenylene ether resin that has a number average molecular weight of 500-5000 and unsaturated double bonds at the molecule terminal; the component (B) crosslinking agent is olefin resin with a number average molecular weight of 500-10000, of which styrene structure comprises 10-50 wt %, and of which the molecule comprises 1,2-addition butadiene structure;

the structural formula of the component (A) functionalized polyphenylene ether resin is as shown in the following formula (1):

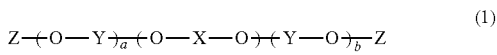

in the formula (1), a and b respectively represent an integer of 1-30, and Z represents a structure defined by the formula (2) or (3):

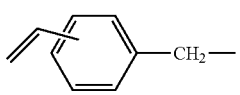

(2)

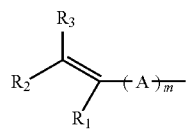

(3)

in the formula (3), A represents arylene, carbonyl, or alkylene with the number of carbon atoms being 1-10, m represents an integer of 0-10, and, $R_1$, $R_2$ and $R_3$ are identical or different, which represent H atom or alkyl with the number of carbon atoms not more than 10;

-(—O—Y—)- in the formula (1) is a structure defined by the formula (4):

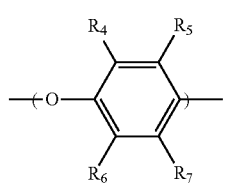

(4)

in the formula (4), $R_4$ and $R_6$ are identical or different, which represent H atom, halogen atom, alkyl with the number of carbon atoms not more than 8, or phenyl; $R_5$ and $R_7$ are identical or different, which represent halogen atom, alkyl with the number of carbon atoms not more than 8, or phenyl;

-(—O—X—O—)- in the formula (1) structure defined by the formula (5):

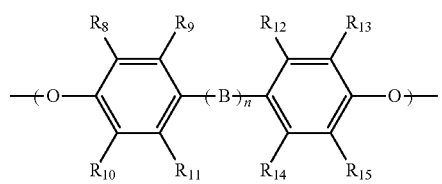

(5)

in the formula (5), $R_8$, $R_9$, $R_{10}$, $R_{11}$, $R_{12}$, $R_{13}$, $R_{14}$ and $R_{15}$ are identical or different, which represent H atom, halogen atom, alkyl with the number of carbon atoms not more than 8, or phenyl; B represents alkylene with the number of carbon atoms not more than 20,

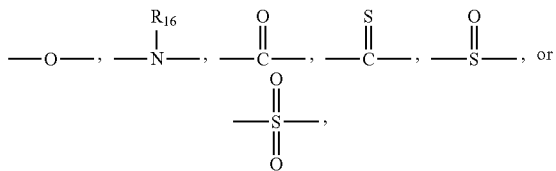

n represents 0 or 1; $R_{16}$ represents H atom, or alkyl with the number of carbon atoms being 1-10.

The usage amount of the component (A) functionalized polyphenylene ether resin comprises 20-90 wt % of the total amount of the component (A) and component (B), and the usage amount of the component (B) crosslinking agent comprises 10-80 wt % of the total amount of the component (A) and component (B), wherein, the content of 1,2-addition butadiene in the molecule of the olefin resin of the component (B) is not less than 20 wt %; taking the total amount of the component (A) and component (B) as 100 parts by weight, the usage amount of the component (C) initiator is 1-5 parts by weight.

The polyphenylene ether resin composition can also comprise silane couple agent, and taking the total amount of the component (A) and component (B) as 100 parts by weight, the usage amount of the silane couple agent is 01-10 parts by weight.

The half-life temperature $t_{1/2}$ of the initiator is not less than 130° C.; the initiator is radical initiator, which is one or more selected from the group consisting of dicumyl peroxide, tert butylperoxy benzoate, 2,5-bis(2-ethylhexanoylperoxy)-2,5-dimethylhexane, di(tert-butylperoxyisopropyl)benzene, b is 2,4-dichlorobenzoyl peroxide, 2,5-dimethyl-2,5-di(tert-butylperoxy)hexane, tert-butylperoxy 2-ethylhexyl carbonate, 2,5-di(tert-butylperoxy)-2,5-dimethyl-3-hexyne, butyl 4,4-bis(tert-butyldioxy)valerate, 1,1-di-(tert-butylperoxy)-3,3,5-trimethylcyclohexane, 3,3,5,7,7-pentamethyl-1,2,4-trioxygen heterocycle methyl heptane, di-t-butyl peroxide, and tert-butyl cumyl peroxide.

The polyphenylene ether resin composition can also comprise flame retardant, which is bromine-containing flame retardant or halogen-free flame retardant; the halogen-free flame retardant can be one or more of phosphorus-containing flame retardant, nitrogen-containing flame retardant, and silicon-containing flame retardant.

The polyphenylene ether resin composition can also comprise organic filler or inorganic filler; the inorganic filler is one or more selected from the group consisting of natural silica, fused silica, spherical silica, hollow silica, glass powder, aluminum nitride, boron nitride, silicon carbide, aluminum hydroxide, titanium dioxide, strontium titanate, barium titanate, alumina, barium sulfate, talcum powder, calcium silicate, calcium carbonate, and mica; the organic filler is one or more selected from polytetrafluoroethylene powder, polyphenylene sulfide powder, and poly(ether sulfones) powder.

Furthermore, the present invention provides a prepreg made from the above mentioned polyphenylene ether resin composition. The prepreg comprises a substrate material, and the polyphenylene ether resin composition that adheres to the substrate material after the substrate material is dipped in the polyphenylene ether resin composition and then is dried.

The substrate material is woven fabric or non-woven fabric made from organic fiber, carbon fiber or glass fiber; for woven fabric or non-woven fabric made from glass fiber, $SiO_2$ comprises 50-80 wt %, CaO comprises 0-30 wt %, $Al_2O_3$ comprises 0-20 wt %, $B_2O_3$ comprises 5-25 wt %, and MgO comprises 0-5 wt %, of the major constituent of the woven fabric or non-woven fabric.

Besides, the present invention also provides a copper clad laminate made from the above mentioned polyphenylene ether resin composition, which comprises a plurality of laminated prepregs and copper foil cladded to one side or two sides of the laminated prepregs, and the prepregs are made from the polyphenylene ether resin composition.

The copper foil is electrolytic copper foil or rolled copper foil, of which the surface roughness is less than 5 m; the copper foil is chemically processed with silane couple agent that is one or a mixture of more selected from epoxy group silane couple agent, ethenyl silane couple agent and acrylate group silane couple agent.

The polyphenylene ether resin composition of the present invention is a composition of functionalized polyphenylene ether resin with a low molecular weight, which has good processability and keeps the good dielectric properties and heat resistance of the polyphenylene ether resin. The prepreg and copper clad laminate made from the polyphenylene ether resin composition have good dielectric properties and heat resistance. Comparing with an ordinary copper foil substrate, the copper clad laminate made from the polyphenylene ether resin composition of present invention has more excellent dielectric properties, namely lower dielectric constant and dielectric loss tangent, and has good heat resistance and moisture resistance, which is fit for the application in the field of high frequency, high speed printed circuit boards, and is fit for the process of multi-layer printed circuit boards.

DESCRIPTION OF THE PREFERRED EMBODIMENT

The polyphenylene ether resin composition of the present invention comprises: (A) functionalized polyphenylene ether resin, (B) crosslinking agent, and (C) initiator. Wherein, the component (A) functionalized polyphenylene ether resin is polyphenylene ether resin with a number average molecular weight of 500-5000 and unsaturated double bonds at the molecule terminal; the structural formula of the component (A) functionalized polyphenylene ether resin is as shown in the following formula (1).

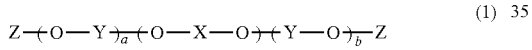
(1)

in the formula (1), a and b respectively represent an integer of 1-30, Z represents a structure defined by the formula (2) or (3), -(—O—Y—)- is a structure defined by the formula (4), and -(—O—X—O—)- is a structure defined by the formula (5).

The formulas (2) and (3) are shown as follows:

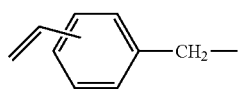
(2)

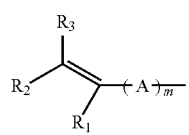
(3)

in the formula (3), A represents arylene, carbonyl, or alkylene with the number of carbon atoms being 1-10, m represents an integer of 0-10, and, $R_1$, $R_2$ and $R_3$ are identical or different, which represent H atom or alkyl with the number of carbon atoms not more than 10.

The formulas (4) is shown as follows:

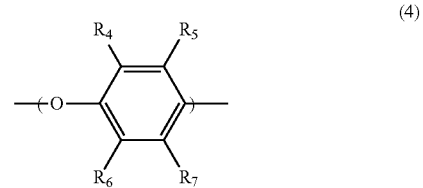
(4)

in the formula (4), $R_4$ and $R_6$ are identical or different, which represent H atom, halogen atom, alkyl with the number of carbon atoms not more than 8, or phenyl; $R_5$ and $R_7$ are identical or different, which represent halogen atom, alkyl with the number of carbon atoms not more than 8, or phenyl.

The formulas (5) is shown as follows:

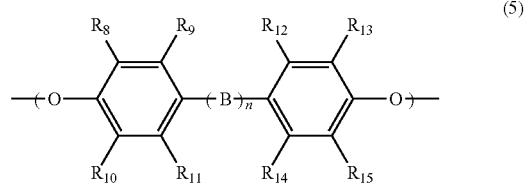
(5)

In the formulas (5), $R_8$, $R_9$, $R_{10}$, $R_{11}$, $R_{12}$, $R_{13}$, $R_{14}$ and $R_{15}$ are identical or different, which represent H atom, halogen atom, alkyl with the number of carbon atoms not more than 8, or phenyl; B represents alkylene with the number carbon atoms not more than 20,

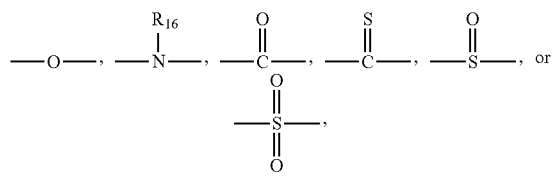

n represents 0 or 1; $R_{16}$ represents H atom, or alkyl with the number of carbon atoms being 1-10.

Concretely speaking, the functionalized polyphenylene ether resin can be as shown in the following structural formula (6) and structural formula (7):

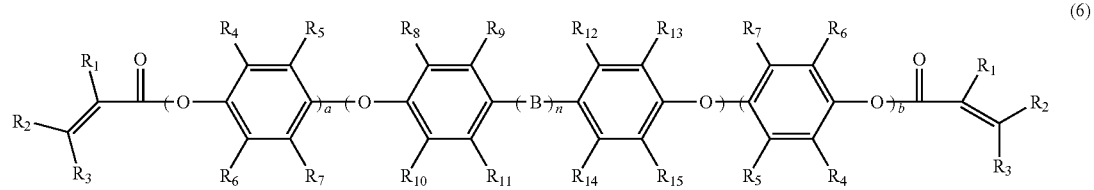
(6)

In the formula (6), $R_1$, $R_2$ and $R_3$ are identical or different, which represent H atom or alkyl with the number of carbon atoms not more than 10; $R_4$ and $R_6$ are identical or different, which represent H atom, halogen atom, alkyl with the number of carbon atoms not more than 8, or phenyl; $R_5$ and $R_7$ are identical or different, which represent halogen atom, alkyl with the number of carbon atoms not more than 8, or phenyl; $R_8$, $R_9$, $R_{10}$, $R_{11}$, $R_{12}$, $R_{13}$, $R_{14}$ and $R_{15}$ are identical or different, which represent H atom, halogen atom, alkyl with the number of carbon atoms not more than 8, or phenyl; a and b respectively represent an integer of 1-30; B represents alkylene with the number of carbon atoms not more than 20,

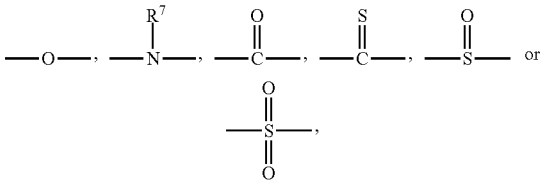

and n represents 0 or 1.

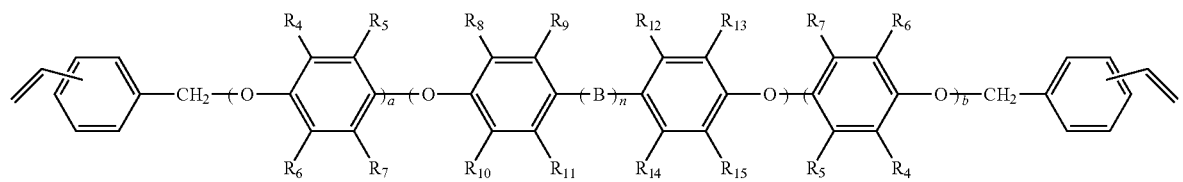

(7)

In the formula (7), $R_4$ and $R_6$ are identical or different, which represent H atom, halogen atom, alkyl with the number of carbon atoms not more than 8, or phenyl; $R_5$ and $R_7$ are identical or different, which represent halogen atom, alkyl with the number of carbon atoms not more than 8, or phenyl; $R_8$, $R_9$, $R_{10}$, $R_{11}$, $R_{12}$, $R_{13}$, $R_{14}$ and $R_{15}$ are identical or different, which represent H atom, halogen atom, alkyl with the number of carbon atoms not more than 8, or phenyl; a and b respectively represent an integer of 1-30; B represents alkylene with the number of carbon atoms not more than 20.

Moreover, the functionalized polyphenylene ether resin can also be as shown in the following structural formula (8) to structural formula (12):

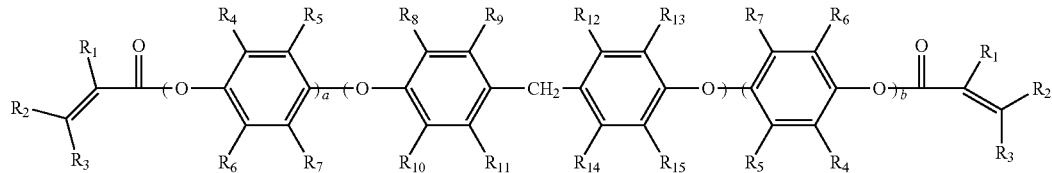

(8)

In the formula (8), $R_1$, $R_2$ and $R_3$ are identical or different, which represent H atom or alkyl with the number of carbon atoms not more than 10; $R_4$ and $R_6$ are identical or different, which represent H atom, halogen atom, alkyl with the number of carbon atoms not more than 8, or phenyl; $R_5$ and $R_7$ are identical or different, which represent halogen atom, alkyl with the number of carbon atoms not more than 8, or phenyl; $R_8$, $R_9$, $R_{10}$, $R_{11}$, $R_{12}$, $R_{13}$, $R_{14}$ and $R_{15}$ are identical or different, which represent H atom, halogen atom, alkyl with the number of carbon atoms not more than 8, or phenyl; a and b respectively represent an integer of 1-30.

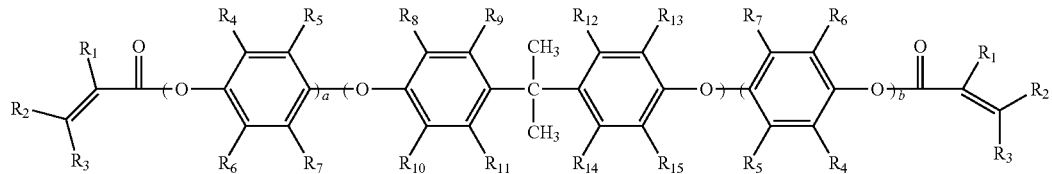

(9)

in the formula (9), $R_1$, $R_2$ and $R_3$ are identical or different, which represent H atom or alkyl with the number of carbon atoms not more than 10; $R_4$ and $R_5$ are identical or different, which represent H atom, halogen atom, alkyl to with the number of carbon atoms not more than 8, or phenyl; $R_5$ and $R_7$ are identical or different, which represent halogen atom, alkyl with the number of carbon atoms not more than 8, or phenyl; $R_8$, $R_9$, $R_{10}$, $R_{11}$, $R_{12}$, $R_{13}$, $R_{14}$ and $R_{15}$ are identical or different, which represent H atom, halogen atom, alkyl with the number of carbon atoms not more than 8, or phenyl; a and b respectively represent an integer of 1-30.

In the formula (12), $R_4$ and $R_6$ are identical or different, which represent H atom, halogen atom, alkyl with the number of carbon atoms not more than 8, or phenyl; $R_5$ and $R_7$ are identical or different, which represent halogen atom, alkyl with the number of carbon atoms not more than 8, or phenyl; $R_8$, $R_9$, $R_{10}$, $R_{11}$, $R_{12}$, $R_{13}$, $R_{14}$ and $R_{15}$ are identical or different, which represent H atom, halogen atom, alkyl with the number of carbon atoms not more than 8, or phenyl; a and b respectively represent an integer of 1-30.

The number average molecular weight of the functionalized polyphenylene ether resin is 500-5000, preferred to be 500-3000, and more preferred to be 800-2500. When using

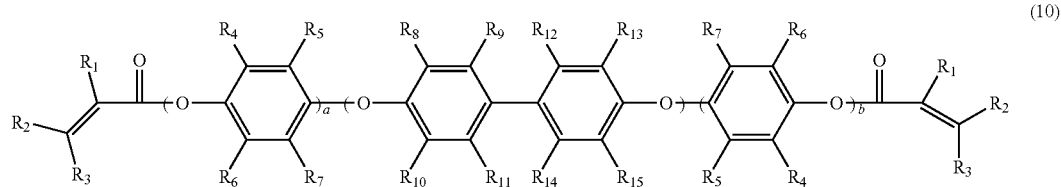

(10)

In the formula (10), $R_1$, $R_2$ and $R_3$ are identical or different, which represent H atom or alkyl with the number of carbon atoms not more than 10; $R_4$ and $R_6$ are identical or different, which represent H atom, halogen atom, alkyl with the number of carbon atoms not more than 8, or phenyl; $R_5$ and R are identical or different, which represent halogen atom, alkyl with the number of carbon atoms not more than 8, or phenyl; $R_8$, $R_9$, $R_{10}$, $R_{11}$, $R_{12}$, $R_{13}$, $R_{14}$ and $R_{15}$ are identical or different, which represent H atom, halogen atom, alkyl with the number of carbon atoms not more than 8, or phenyl; a and b respectively represent an integer of 1-30.

a functionalized polyphenylene ether resin with the number average molecular weight over 5000, the solutability during processing will get poor, causing that conventional laminate process technology are not fit for the glue-size process, so, it need to be heated, which will make the technical difficulties in processing a copper clad laminate: the operation is dangerous, and the flowability will decrease, thereby making it hard to process a multi-layer PCB. When using a functionalized polyphenylene ether resin with the number average molecular weight below 500, the heat resistance and dielectric properties will decrease, which is bad for obtain-

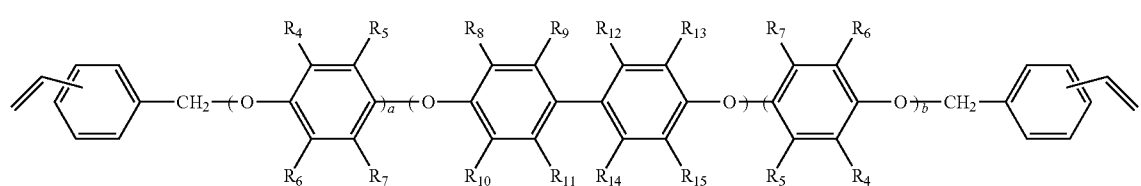

(11)

In the formula (11), $R_4$ and $R_6$ are identical or different, which represent H atom, halogen atom, alkyl with the number of carbon atoms not more than 8, or phenyl; $R_5$ and $R_7$ are identical or different, which represent halogen atom, alkyl with the number of carbon atoms not more than 8, or phenyl; $R_8$, $R_9$, $R_{10}$, $R_{11}$, $R_{12}$, $R_{13}$, $R_{14}$ and $R_{15}$ are identical or different, which represent H atom, halogen atom, alkyl with the number of carbon atoms not more than 8, or phenyl; a and b respectively represent an integer of 1-30.

ing a resin composition and a laminate material with high heat resistance, and meanwhile the dielectric properties will also decrease.

While being mixed with a crosslinking agent, a functionalized polyphenylene ether resin with a comparatively small number average molecular weight will improve the compatibility better between the functionalized polyphenylene ether resin and the crosslinking agent, that is, the smaller is the number average molecular weight, the better is the

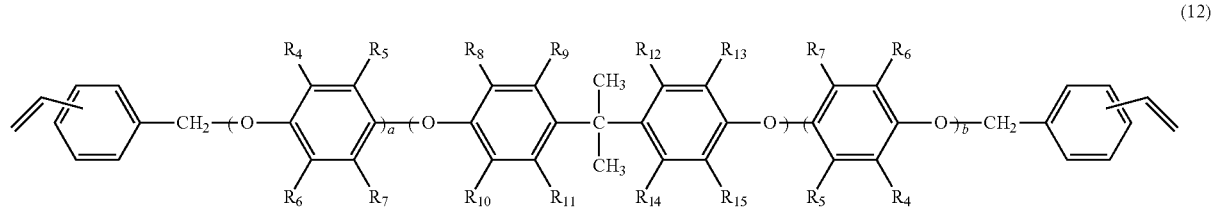

(12)

compatibility between the mixed components, and the better is the storage stability. Besides, a comparatively small number average molecular weight can provide a better flowability, which is good for providing better glue-filling property during making multi-layer PCBs. The usage amount of the component (A) functionalized polyphenylene ether resin comprises 20-90 wt % of the total amount of the component (A) and component (B).

The crosslinking agent is olefin resin with a number average molecular weight of 500-10000, of which styrene structure comprises 10-50 wt %, and of which the molecule comprises 1,2-addition butadiene structure. The crosslinking agent can react with the end group functionalized polyphenylene ether resin via copolymerization reaction, to form a cross-linked network and provide good dielectric properties. The styrene segments contained in the olefin resin structure can make the crosslinking agent to have excellent compatibility with the functionalized polyphenylene ether resin; when the weight ratio of the styrene structure is less than 10%, the compatibility between the functionalized polyphenylene ether resin and the crosslinking agent is poor, so, it is unable to form a uniform stable solution, and phase separation will easily occur in the glue solution during storage; when the weight ratio of the styrene structure is more than 50%, the weight ratio of the butadiene unit structure is too little, and the unsaturated double bonds are also not provided sufficiently to give good crosslinking effect, causing the heat resistance of the curing system is decreased, moreover, the styrene structure is too much, thereby increasing the brittleness of the curing system to make the processability get poor. The usage amount of the component (B) crosslinking agent comprises 10-80 wt % of the total amount of the component (A) and component (B).

In addition, the present invention uses olefin resin of large molecule as the component (B) crosslinking agent, of which the content of 1,2-addition butadiene structure in the molecule is not less than 20 wt %, and preferred to be not less than 30 wt %; the olefin resin, via the unsaturated double bonds of the 1,2-addition butadienyl in the molecule thereof, can perform crosslinking and curing with the functionalized polyphenylene ether resin well to form a three-dimensional network, thereby effectively improving the heat resistance of the final laminate materials. The content of 1,2-addition butadienyl in the molecule of the olefin resin is further preferred to be not less than 50 wt %, and is more preferred to be not less than 70 wt %. When the content of 1,2-addition butadienyl in the molecule is less than 20 wt %, no sufficient unsaturated double bonds are provided to the crosslinking reaction, thereby the heat resistance of the cured product being poor. The olefin resin may be one or a mixture of more selected from butadiene-styrene copolymer, styrene-isoprene copolymer, and butadiene-styrene-divinyl benzene terpolymer. The optional, commercial products are such as R100, R181, R184, R104, R250 and R257 provided by SARTOMER Company, but the olefin resin is not limited to the above mentioned products.

The object of the component (C) initiator in the polyphenylene ether resin composition of the present invention is to improve the effect of crosslinking and curing. Although the functionalized polyphenylene ether resin and crosslinking agent may be cured under high temperature by heating, the technological condition in the laminate application can not meet the high temperature requirement, thereby increasing the processing difficulty, on the other hand, it is bad for efficiency and will increase production cost. Hence, the addition of the initiator is further helpful. Taking the total amount of the component (A) and component (B) as 100 parts by weight, the usage amount of the component (C) initiator is 1-5 parts by weight.

The half-life temperature $t_{1/2}$ of the component (C) initiator is not less than 130° C.; in the present invention, the initiator is radical initiator, of which the half-life temperature t½ is between 120° C. and 200° C., so as to improve the properties, such as the heat resistance, of the polyphenylene ether resin composition, and to increase the curing efficiency. The radical initiator, such as peroxide radical initiator, can be one or more selected from the group consisting of dicumyl peroxide, tert butylperoxy benzoate, 2,5-bis(2-ethylhexanoylperoxy)-2,5-dimethylhexane, di(tert-butylperoxyisopropyl)benzene, b is 2,4-dichlorobenzoyl peroxide, 2,5-dimethyl-2,5-di(tert-butylperoxy)hexane, tert-butylperoxy 2-ethylhexyl carbonate, 2,5-di(tert-butylperoxy)-2,5-dimethyl-3-hexyne, butyl 4,4-bis(tert-butyldioxy)valerate, 1,1-di-(tert-butylperoxy)-3,3,5-trimethylcyclohexane, 3,3,5,7,7-pentamethyl-1,2,4-trioxygen heterocycle methyl heptane, di-t-butyl peroxide, and tert-butyl cumyl peroxide. In the above mentioned initiators, dicumyl peroxide is preferred, because dicumyl peroxide has comparatively high half-life temperature and initial reaction temperature, which will not excessively initiate the curing reaction when curing is not needed or is in semi-curing process, and also will not decrease the storage stability of the polyphenylene ether resin.

The present invention as required can also comprise flame retardant, which will provide the cured resin with flame retardance to meet the standard of UL94V-0. The flame retardant added as required is not particularly restrictive, which is comparatively good if it will not affect the dielectric properties. The flame retardant can be bromine-containing flame retardant or halogen-free flame retardant; the halogen-free flame retardant can be one or more selected from phosphorus-containing flame retardant, nitrogen-containing flame retardant, and silicon-containing flame retardant. The bromine-containing flame retardant can be decabromodiphenyl ether, decabromodiphenylethane, brominated styrene, ethylenebis(tetrabromophthalimide), or brominated polycarbonate; the halogen-free flame retardant can be tris(2,6-dimethylphenyl) phosphine, 10-(2,5-dihydroxyphenyl)-9,10-dihydro-9-oxa-10-phosphaphenanthrene-10-oxide, 2,6-(2,6-dimethylphenyl) phosphino phenyl, 10-phenyl-9,10-dihydro-9-oxa-10-phosphaphenanthrene-10-oxide, phenoxy phosphazene compound, phosphate ester, or polyphosphate ester. The flame retardant can be optional, commercial materials; the bromine-containing flame retardant can be selected from BT-93, BT-93W, HP-8010 and HP-3010; the halogen-free flame retardant can be selected from SP-100, PX-200, PX-202, FR-700, OP-930, OP-935 and FP-2200; but, the flame retardant is not limited to the above mentioned types. The usage amount of the flame retardant is not particularly restrictive, which can be determined according to meeting the requirement that the cured resin can reach the level of UL 94 V-0. Considering from not sacrificing the heat resistance, dielectric properties and hydroscopic property of the cured resin, taking the total amount of the component (A) and component (B) as 100 parts by weight, the usage amount of the flame retardant is 5-80 parts by weight, preferred to be 10-60 parts by weight, and more preferred to be 15-40 parts by weight. When the additive amount of the flame retardant is not enough, good flame retardant effect can not be achieved; when the additive amount of the flame retardant is more than 80 parts by weight, the system of the polyphenylene ether resin composition will have a risk of heat resistance reduction, hydroscopic property increase, and the dielectric properties deterioration.

The present invention can further comprise organic filler or inorganic filler as required. The filler that can be added as required is not particularly restrictive; the inorganic filler can be one or more selected from the group consisting of natural silica, fused silica, spherical silica, hollow silica, glass powder, aluminum nitride, boron nitride, silicon carbide, aluminum hydroxide, titanium dioxide, strontium titanate, barium titanate, alumina, barium sulfate, talcum powder, calcium silicate, calcium carbonate, and mica; the organic filler can be one or more selected from polytetrafluoroethylene powder, polyphenylene sulfide, and poly(ether sulfones) powder. In addition, the shape, particle diameter, etc. of the inorganic filler is not particularly restrictive. The particle diameter generally is 0.01-50 μm, preferred to be 0.01-20 μm, and more preferred to be 0.01-10 μm; the inorganic filler in such a range of particle diameter is more easily dispersed in the resin solution. In addition, the usage amount of the filler is not particularly restrictive; taking the total amount of the component (A) and component (B) as 100 parts by weight, the usage amount of the filler is 5-300 parts by weight, preferred to be 5-200 parts by weight, and more preferred to be 5-150 parts by weight.

In addition, as required, the present invention can also comprise a couple agent, of which the types are not particularly restrictive. The couple agent can further reduce the surface tension of the cured resin, thereby further reducing the viscosity thereof and improving the flowability of the resin composition. Particularly in the condition of the filler being added, addition of the couple agent can effectively improve the bonding force between the resin and the filler, and eliminate the interface therebetween, thereby further decreasing the hydroscopic property of the cured resin. The couple agent can be silane, silane prepolymer, or titanate; the silane couple agent can be epoxy group silane couple agent, amino silane couple agent, phenylamino group silane couple agent, ethenyl silane couple agent, isocyanate group silane couple agent, propenyl silane couple agent, isobutenyl silane couple agent, styryl silane couple agent, ureido silane couple agent, chloropropyl silane couple agent, sulfydryl silane couple agent, vulcanizing group silane couple agent, etc. Besides, the usage amount of the couple agent is not particularly restrictive. Taking the total amount of the component (A) and component (B) as 100 parts by weight, the usage amount of the couple agent is 0.1-10 parts by weight, preferred to be 0.5-8 parts by weight, and more preferred to be 1-5 parts by weight.

The polyphenylene ether resin composition of the present invention can be used to make prepregs by saturating a substrate material therewith. A prepreg made from the polyphenylene ether resin composition of the present invention comprises a substrate material, and the polyphenylene ether resin composition that adheres to the substrate material after the substrate material is dipped in the polyphenylene ether resin composition and then is dried. In the process of making prepregs, firstly the functionalized polyphenylene ether resin, the crosslinking agent, the initiator and other components of necessarily) are dissolved in one or more organic solvents to prepare a uniform glue solution. The organic solvent is not particularly restrictive, only if it could dissolve the above mentioned components and would not affect the reactivity thereof; suitable solvents include: ketones, such as methyl ethyl ketone, acetone; ethers, such as propylene glycol monomethyl ether, dibutyl ether; esters, such as ethyl acetate; aromatics, such as toluene, xylene; halogenated hydrocarbons, such as trichloroethane. Each solvent may be used alone or in combination with other solvent. The concentration of resin solid matter in the glue solution can be appropriately varied according to the category of the substrate material saturated with the glue solution and the technology thereof, for example, an appropriate concentration of resin solid matter in the glue solution is 30-80%. Use the above prepared glue solution to saturate a substrate material, then heat and dry the substrate material to eliminate the organic solvent and partly cure the resin composition in the substrate material, thereby obtaining the prepreg. All woven fabric or non-woven fabric made from any well-known organic fiber, carbon fiber or glass fiber can be used as the substrate material for the prepregs. The organic fiber includes aramid fiber, such as Kevlar fiber provided by Dupont Corporation; woven fabric or non-woven fabric made from glass fiber is not particularly restrictive, wherein, $SiO_2$ comprises 50-80 wt %, CaO comprises 0-30 wt %, $Al_2O_3$ comprises 0-20 wt %, $B_2O_3$ comprises 5-25 wt and MgO comprises 0-5 wt % of the major constituent thereof, but, the woven fabric or non-woven fabric is not limited to the above mentioned components. The substrate material is preferred to be electronic grade E fiberglass cloth, NE type fiberglass cloth, D type fiberglass cloth, or S type fiberglass cloth, and is more preferred to be NE type fiberglass cloth. The thickness of the fiberglass cloth to be used is also not particularly restrictive.

The content of the resin used to saturate the above mentioned substrate material is preferred to make the resin in the prepreg comprise 30 wt % or more of the prepreg. Because the dielectric constant of the substrate material is generally higher than that of the resin composition, the content of the resin composition in the prepreg is preferably higher than the above mentioned content, so as to reduce the dielectric constant of the laminate made from the prepreg. For example, if a laminate is made from prepregs of which the resin component comprises 40 wt %, the dielectric constant is 3.5; and if a laminate is made from prepregs of which the resin component comprises 50 wt % or more, the dielectric constant is 3.2 or less. In addition, the above mentioned prepregs are baked at the temperature of 80-170° C. for 2-15 minutes, but the condition is not limited to that.

In the present invention, a copper clad laminate made from the above mentioned prepregs comprises: a plurality of laminated prepregs and copper foil cladded to one side or two sides of the laminated prepregs. Concretely speaking, mutually overlap one or more prepregs of the present invention, clad copper foil to one side or two sides of the mutually overlapped prepregs, then prepare a laminate by heat pressing, and finally etch the copper foil at the surface of the laminate to form circuit diagram as required, thereby obtaining a PCB. Besides, a multi-layer PCB can be prepared via the following method and steps: use a PCB as the inner layer PCB, process a surface treatment to the copper foil on the inner layer PCB, then as required in a certain sequence by heat pressing laminate prepregs of the present invention and the above to mentioned inner layer PCB after the surface treatment. The condition of heat pressing can be determined according to the component proportion of the polyphenylene ether resin composition of the present invention, which is not particularly restrictive. The condition of heat pressing is preferred to be in the temperature range of 150-250° C., and in the pressure range of 1.0-10.0 MPa to be heated and pressed for a period of time. The laminate and PCB prepared by such method and steps have good high frequency property, such as dielectric properties, and meanwhile also have good processability, heat resistance and moisture resistance.

Besides, in order to further improve the application of the resin material in the high frequency, high speed field, the copper foil used in making the copper clad laminate of the present invention can be electrolytic copper foil or rolled copper foil, of which the surface roughness is less than 5 m, so as to reduce the signal loss when the laminate material is used in high frequency, high speed PCB. At the same time, in order to improve the bonding force of the surface of the copper foil in contact with the prepreg, the above mentioned copper foil can be chemically processed with silane couple agent that is one or a mixture of more selected from epoxy group silane couple agent, ethenyl silane couple agent and acrylate group silane couple agent. So, the bonding force between the copper foil and substrate material can be improved to avoid the risk of dropping solder pads, dropping cores, etc. during using the PCB.

The embodiments of the present invention are detailedly described as follows, of which the physical properties are as shown in Table 1, but they are not to limit the scope of the present invention.

Embodiment 1

Mix 70 parts by weight of methacrylic acid terminated polyphenylene ether resin MMA-PPE (SA9000, provided by SABIC COMPANY) with 70 parts by weight of methylbenzene as a solvent, thereby completely dissolving into a functionalized polyphenylene ether resin solution, then add 30 parts by weight of styrene-butadiene copolymer R100 (provided by Sartomer Co.) as a crosslinking agent, 3 parts by weight of dicumyl peroxide DCP as an initiator, 15 parts by weight of ethylene bis(tetrabromo phthalimide) BT-93W (bromine content being 67.2%, provided by Albemarle Co.) as a bromine-containing flame retardant, 45 parts by weight of silica SO—C2 (D50: 0.5 µm, provided by Japanese Admatechs) as a filler, and 2 parts by weight of 3-glycidoxypropyl trimethoxysilane KBM-403 (provided by Shin-Etsu Chemical Co., Ltd.) into the solution, mix the above mentioned mixture in methylbenzene, and stir to dissolve into a uniform resin composition, namely a glue solution.

Next, use the prepared uniform glue solution to saturate E-fiberglass cloth (type: 3313, provided by Nitto spinning), and heat and dry the E-fiberglass cloth at 155° C. for 3-10 minutes to completely volatilize the solvent, thereby obtaining prepergs. Mutually overlap eight pieces of the above prepared prepregs, then respectively clad two pieces of 35-µm-thick copper foils to the two surfaces of the overlapped prepregs, and process the assembly of the two copper foils and eight prepregs by heat pressing at a temperature of 200° C. and a pressure of 3.0 MPa for 90 minutes, thereby obtaining a double-sided copper clad laminate.

Embodiment 2

Mix 50 parts by weight of methacrylic acid terminated polyphenylene ether resin MMA-PPE (SA9000, provided by SABIC COMPANY) with 50 parts by weight of methylbenzene as a solvent, thereby completely dissolving into a functionalized polyphenylene ether resin solution, then add 50 parts by weight of styrene-butadiene copolymer R181 (provided by Sartomer Co.) as a crosslinking agent, 3 parts by weight of dicumyl peroxide DCP as an initiator, 15 parts by weight of ethylene bis(tetrabromo phthalimide) BT-93W (bromine content being 67.2%, provided by Albemarle Co.) as a bromine-containing flame retardant, 45 parts by weight of silica SO—C2 (D50: 0.5 µm, provided by Japanese Admatechs) as a filler, and 2 parts by weight of 3-glycidoxypropyl trimethoxysilane KBM-403 (provided by Shin-Etsu Chemical Co., Ltd.) into the solution, mix the above mentioned mixture in methylbenzene, and stir to dissolve into a uniform resin composition, namely a glue solution.

Next, use the prepared uniform glue solution to saturate E-fiberglass cloth (type: 3313, provided by Nitto spinning), and heat and dry the E-fiberglass cloth at 155° C. for 3-10 minutes to completely volatilize the solvent, thereby obtaining prepergs. Mutually overlap eight pieces of the above prepared prepregs, then respectively clad two pieces of 35-m-thick copper foils to the two surfaces of the overlapped prepregs, and process the assembly of the two copper foils and eight prepregs by heat pressing at a temperature of 200° C. and a pressure of 3.0 MPa for 90 minutes, thereby obtaining a double-sided copper clad laminate.

Embodiment 3

Mix 65 parts by weight of styrene terminated polyphenylene ether resin St-PPE-1 (provided by Mitsubishi CHEMICAL CO.) with 65 parts by weight of methylbenzene as a solvent, thereby completely dissolving into a functionalized polyphenylene ether resin solution, then add 35 parts by weight of styrene-butadiene copolymer R100 (provided by Sartomer Co.) as a crosslinking agent, 3 parts by weight of dicumyl peroxide DCP as an initiator, 15 parts by weight of ethylene bis(tetrabromo phthalimide) BT-93W (bromine content being 67.2%, provided by Albemarle Co.) as a bromine-containing flame retardant, 45 parts by weight of silica SO—C2 (D50: 0.5 µm, provided by Japanese Admatechs) as a filler, and 2 parts by weight of 3-glycidoxypropyl trimethoxysilane KBM-403 (provided by Shin-Etsu Chemical Co., Ltd.) into the solution, mix the above mentioned mixture in methylbenzene, and stir to dissolve into a uniform resin composition, namely a glue solution.

Next, use the prepared uniform glue solution to saturate E-fiberglass cloth (type: 3313, provided by Nitto spinning), and heat and dry the E-fiberglass cloth at 155° C. for 3-10 minutes to completely volatilize the solvent, thereby obtaining prepergs. Mutually overlap eight pieces of the above prepared prepregs, then respectively clad two pieces of 35-µm-thick copper foils to the two surfaces of the overlapped prepregs, and process the assembly of the two copper foils and eight prepregs by heat pressing at a temperature of 200° C. and a pressure of 3.0 MPa for 90 minutes, thereby obtaining a double-sided copper clad laminate.

Embodiment 4

Mix 80 parts by weight of styrene terminated polyphenylene ether resin St-PPE-1 (provided by Mitsubishi CHEMICAL CO.) with 65 parts by weight of methylbenzene as a solvent, thereby completely dissolving into a functionalized polyphenylene ether resin solution, then add 20 parts by weight of styrene-butadiene copolymer R100 (provided by Sartomer Co.) as a crosslinking agent, 3 parts by weight of dicumyl peroxide DCP as an initiator, 15 parts by weight of ethylene bis(tetrabromo phthalimide) BT-93W (bromine content being 67.2%, provided by Albemarle Co.) as a bromine-containing flame retardant, 45 parts by weight of silica SO—C2 (D50: 0.5 µm, provided by Japanese Admatechs) as a filler, and 2 parts by weight of vinyltrimethoxysilane KBM-1003 (provided by Shin-Etsu Chemical Co., Ltd.) into the solution, mix the above mentioned mixture in methylbenzene, and stir to dissolve into a uniform resin composition, namely a glue solution.

Next, use the prepared uniform glue solution to saturate NE-fiberglass cloth (type: 3313, provided by Nitto spinning), and heat and dry the NE-fiberglass cloth at 155° C. for 3-10 minutes to completely volatilize the solvent, thereby obtaining prepergs. Mutually overlap eight pieces of the above prepared prepregs, then respectively clad two pieces of 35-m-thick copper foils to the two surfaces of the overlapped prepregs, and process the assembly of the two copper foils and eight prepregs by heat pressing at a temperature of 200° C. and a pressure of 3.0 MPa for 90 minutes, thereby obtaining a double-sided copper clad laminate.

Embodiment 5

Mix 65 parts by weight of styrene terminated polyphenylene ether resin St-PPE-2 (provided by Mitsubishi CHEMICAL CO.) with 65 parts by weight of methylbenzene as a solvent, thereby completely dissolving into a functionalized polyphenylene ether resin solution, then add 35 parts by weight of styrene-butadiene-divinyl benzene terpolymer R250 (provided by Sartomer Co.) as a crosslinking agent, 3 parts by weight of dicumyl peroxide DCP as an initiator, 15 parts by weight of ethylene bis(tetrabromo phthalimide) BT-93W (bromine content being 67.2%, provided by Albemarle Co.) as a bromine-containing flame retardant, 45 parts by weight of silica SO—C2 (D50: 0.5 μm, provided by Japanese Admatechs) as a filler, and 2 parts by weight of vinyltrimethoxysilane KBM-1003 (provided by Shin-Etsu Chemical Co., Ltd.) into the solution, mix the above mentioned mixture in methylbenzene, and stir to dissolve into a uniform resin composition, namely a glue solution.

Next, use the prepared uniform glue solution to saturate NE-fiberglass cloth (type: 3313, provided by Nitto spinning), and heat and dry the NE-fiberglass cloth at 155° C. for 3-10 minutes to completely volatilize the solvent, thereby obtaining prepergs. Mutually overlap eight pieces of the above prepared prepregs, then respectively clad two pieces of 35-μm-thick copper foils to the two surfaces of the overlapped prepregs, and process the assembly of the two copper foils and eight prepregs by heat pressing at a temperature of 200 and a pressure of 3.0 MPa for 90 minutes, thereby obtaining a double-sided copper clad laminate.

Comparison Example 1

Mix 80 parts by weight of styrene terminated polyphenylene ether resin PPE (SA9000, provided by SABIC COMPANY) with 50 parts by weight of methylbenzene as a solvent, thereby completely dissolving into a functionalized polyphenylene ether resin solution, then add 20 parts by weight of triallyl isocyanurate (TAIC) as a crosslinking agent, 3 parts by weight of dicumyl peroxide DCP as an initiator, 15 parts by weight of ethylene bis(tetrabromo phthalimide) BT-93W (bromine content being 67.2%, provided by Albemarle Co.) as a bromine-containing flame retardant, and 45 parts by weight of silica SO—C2 (D50: 0.5 μm, provided by Japanese Admatechs) as a filler into the solution, mix the above mentioned mixture in methylbenzene, and stir to dissolve into a uniform resin composition, namely a glue solution.

Next, use the prepared uniform glue solution to saturate E-fiberglass cloth (type: 3313, provided by Nitto spinning), and heat and dry the E-fiberglass cloth at 155° C. for 3-10 minutes to completely volatilize the solvent, thereby obtaining prepergs. Mutually overlap eight pieces of the above prepared prepregs, then respectively clad two pieces of 35-m-thick copper foils to the to two surfaces of the overlapped prepregs, and process the assembly of the two copper foils and eight prepregs by heat pressing at a temperature of 200° C. and a pressure of 3.0 MPa for 90 minutes, thereby obtaining a double-sided copper clad laminate.

Comparison Example 2

Mix 75 parts by weight of styrene terminated polyphenylene ether resin St-PPE-1 (provided by Mitsubishi CHEMICAL CO.) with 50 parts by weight of methylbenzene as a solvent, thereby completely dissolving into a functionalized polyphenylene ether resin solution, then add 25 parts by weight of divinyl benzene (DVB) as a crosslinking agent, 3 parts by weight of dicumyl peroxide DCP as an initiator, 15 parts by weight of ethylene bis(tetrabromo phthalimide) BT-93W (bromine content being 67.2%, provided by Albemarle Co.) as a bromine-containing flame retardant, and 45 parts by weight of silica SO—C2 (D50: 0.5 μm, provided by Japanese Admatechs) as a filler into the solution, mix the above mentioned mixture in methylbenzene, and stir to dissolve into a uniform resin composition, namely a glue solution.

Next, use the prepared uniform glue solution to saturate E-fiberglass cloth (type: 3313, provided by Nitto spinning), and heat and dry the E-fiberglass cloth at 155° C. for 3-10 minutes to completely volatilize the solvent, thereby obtaining prepergs. Mutually overlap eight pieces of the above prepared prepregs, then respectively clad two pieces of 35-μm-thick copper foils to the two surfaces of the overlapped prepregs, and process the assembly of the two copper foils and eight prepregs by heat pressing at a temperature of 200° C. and a pressure of 3.0 MPa for 90 minutes, thereby obtaining a double-sided copper dad laminate.

TABLE 1

| Formula of the composition and the physical property data thereof | | | | | | | |
|---|---|---|---|---|---|---|---|
| test item | Embodiment 1 | Embodiment 2 | Embodiment 3 | Embodiment 4 | Embodiment 5 | Comparison example 1 | Comparison example 2 |
| compatibility | good | good | good | good | good | good | good |
| peel strength 1 OZ, N/mm | 1.3 | 1.4 | 1.45 | 1.4 | 1.35 | 0.8 | 0.5 |
| volatility | no | no | no | no | no | yes | yes |
| flowability | good | good | good | good | good | good | good |
| Tg (DMA)/° C. | 230 | 220 | 220 | 240 | 235 | 220 | 200 |
| Dk (10 GHz) | 3.7 | 3.65 | 3.7 | 3.3 | 3.4 | 3.5 | 3.6 |
| Df (10 GHz) | 0.0045 | 0.0043 | 0.0038 | 0.0035 | 0.004 | 0.005 | 0.0045 |

The listed materials are specifically as follows:

MMA-PPE: methacrylic acid terminated polyphenylene ether resin, with a number average molecular weight (Mn) of 2800;

St-PPE-1: styrene terminated polyphenylene ether resin, with a number average molecular weight (Mn) of 2200;

St-PPE-2: styrene terminated polyphenylene ether resin, with a number average molecular weight (Mn) of 1200;

R100: styrene-butadiene copolymer, with a number average molecular weight (Mn) of 4500, the content of styrene being 25 wt % and the content of 1,2-addition butadienyl being 70 wt %;

R181: styrene-butadiene copolymer, with a number average molecular weight (Mn) of 3200, the content of styrene being 28 wt % and the content of 1,2-addition butadienyl being 30 wt %;

R250: styrene-butadiene-divinyl benzene terpolymer, with a number average molecular weight (Mn) of 5300, the content of styrene being 35 wt %;

DCP: dicumyl peroxide;

BT-93W: ethylene bis(tetrabromo phthalimide);

SO—C2: spherical silica, with a median particle diameter D50 of 0.5 μm;

KBM-403: 3-glycidoxypropyl trimethoxysilane;

KBM-1003: vinyltrimethoxysilane.

Test method for the above mentioned characteristics is as follows.

(1) The glass transition temperature (Tg): using DMA test to measure according to DMA test method provided in IPC-TM-650 2.4.24.

(2) Dielectric constant (Dk) and dielectric dissipation factor test according to SPDR method.

(3) still the mixed glue solution, watch the glue solution whether is uniform, transparent solution or not, then still the solution for 24 hours, and watch the glue solution whether is layered or not; test method for volatility: bake the prepared prepregs at 155° C. for 10 minutes, then weigh the weight loss of the prepregs, and it will show that the resin composition has high volatility if the weight loss is over 2 wt %; the flowability of the resin composition can be tested according to common flowability test method well known in the art.

Physical Property Analysis

As shown in the physical property data of table 1 according to the embodiments 1-5: the olefin resin with styrene segments has good compatibility with the functionalized polyphenylene ether resin, so, the prepared laminate materials have good heat resistance dielectric properties. In the comparison to examples 1-2, triallyl isocyanurate (TAIC) and divinyl benzene (DVB) that are multifunctional low molecular weight compounds are used as crosslinking agent, and they can achieve good crosslinking and curing effect, however, in the process of making prepregs and laminates, triallyl isocyanurate (TAIC) and divinyl benzene (DVB) have high volatility.

In summary, comparing with an ordinary copper foil substrate, the copper clad laminate made from the polyphenylene ether resin composition of present invention has more excellent dielectric properties, namely lower dielectric constant and dielectric loss tangent, and has good heat resistance and moisture resistance, which is fit for the application in the field of high frequency, high speed printed circuit boards, and is fit for the process of multi-layer printed circuit boards.

Although the present invention has been described in detail with above said preferred embodiments, but it is not to limit the scope of the invention. So, all the modifications and changes according to the characteristic and spirit of the present invention, are involved in the protected scope of the invention.

What is claimed is:

1. A polyphenylene ether resin composition comprising: (A) functionalized polyphenylene ether resin, (B) crosslinking agent and (C) initiator, wherein component (A) is a polyphenylene ether resin with a number average molecular weight of 1200-2200 and unsaturated double bonds at the molecule terminal, component (B) is an olefin resin with a number average molecular weight of 4500-5300, styrene structure comprising 10-50 wt % of the olefin resin, the molecule of the olefin resin comprising a 1,2-addition butadiene structure, the structural formula of component (A) is as shown in the following formula (1):

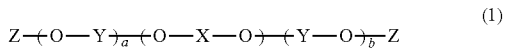

wherein a and b respectively represent an integer of 1-30 and Z represents a structure defined by formula (2):

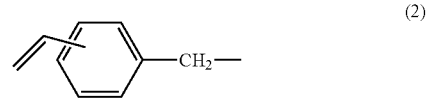

-(—O—Y—)- in the formula (1) is a structure defined by the formula (4);

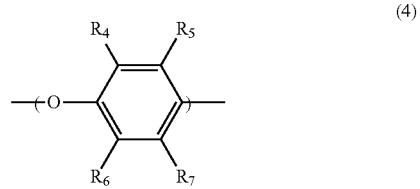

wherein each of $R_4$ and $R_6$ are $CH_3$, each of $R_5$ and $R_7$ are H, -(—O—X—O—)- in formula (1) is a structure defined by formula (5):

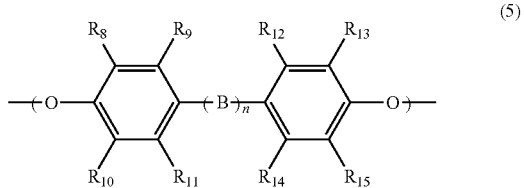

wherein each of $R_8$, $R_9$, $R_{10}$, $R_{12}$, $R_{13}$, and $R_{15}$ are $CH_3$, each of $R_{11}$ and $R_{14}$ are H, and B represents a bond;

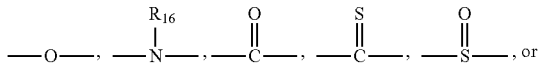

-continued

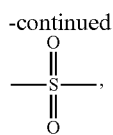

wherein the usage amount of the component (A) functionalized polyphenylene ether resin comprises 20-90 wt % of the total amount of the component (A) and component (B), and the usage amount of the component (B) crosslinking agent comprises 10-80 wt % of the total amount of the component (A) and component (B); the content of 1,2-addition butadienyl in the molecule of the olefin resin of the component (B) is not less than 30 wt %; taking the total amount of the component (A) and component (B) as 100 parts by weight, the usage amount of the component (C) initiator is 1-5 parts by weight; and wherein the half-life temperature $t_{1/2}$ of the initiator is not less than 130° C.; the initiator is a radical initiator, which is one or more selected from the group consisting of dicumyl peroxide, tert butylperoxy benzoate, 2,5-bis(2-ethylhexanoylperoxy)-2,5-dimethylhexane, di(tert-butylperoxyisopropyl)benzene, bis 2,4-dichlorobenzoyl peroxide, 2,5-dimethyl-2,5-di(tert-butylperoxy)hexane, tert-butylperoxy 2-ethylhexyl carbonate, 2,5-di(tert-butylperoxy)-2,5-dimethyl-3-hexyne, butyl 4,4-bis(tert-butyldioxy)valerate, 1,1-di-(tert-butylperoxy)-3,3,5-trimethylcyclohexane, 3,3,5,7,7-pentamethyl-1,2,4-trioxygen heterocycle methyl heptane, di-t-butyl peroxide, and tert-butyl cumyl peroxide;

wherein the composition has a Tg of 220-240° C. and Df at 10 GHz of 0.0035-0.004.

2. The polyphenylene ether resin composition of claim 1, wherein the polyphenylene ether resin composition also comprises silane couple agent and flame retardant; taking the total amount of the component (A) and component (B) as 100 parts by weight, the usage amount of the silane couple agent is 0.1-10 parts by weight; the flame retardant is bromine-containing flame retardant or halogen-free flame retardant; the halogen-free flame retardant is one or more of phosphorus-containing flame retardant, nitrogen-containing flame retardant, and silicon-containing flame retardant.

3. The polyphenylene ether resin composition of claim 1, wherein it also comprises organic filler or inorganic filler; the inorganic filler is one or more selected from the group consisting of natural silica, fused silica, spherical silica, hollow silica, glass powder, aluminum nitride, boron nitride, silicon carbide, aluminum hydroxide, titanium dioxide, strontium titanate, barium titanate, alumina, barium sulfate, talcum powder, calcium silicate, calcium carbonate, and mica; the organic filler is one or more selected from the group consisting of polytetrafluoroethylene powder, polyphenylene sulfide, polyether imide, polyphenylene ether, and poly(ether sulfones) powder.

4. A prepreg made from the polyphenylene ether resin composition of claim 1, wherein the prepreg comprises a substrate material, and the polyphenylene ether resin composition that adheres to the substrate material after the substrate material is dipped in the polyphenylene ether resin composition and then is dried.

5. The prepreg of claim 4, wherein the substrate material is woven fabric or non-woven fabric made from organic fiber, carbon fiber or glass fiber; for woven fabric or non-woven fabric made from glass fiber, $SiO_2$ comprises 50-80 wt %, CaO comprises 0-30 wt %, $Al_2O_3$ comprises 0-20 wt %, $B_2O_3$ comprises 5-25 wt %, and MgO comprises 0-5 wt %, of the major constituent of the woven fabric or non-woven fabric.

6. A copper clad laminate made from the polyphenylene ether resin composition of claim 1, wherein the copper clad laminate comprises a plurality of laminated prepregs and copper foil cladded to one side or two sides of the laminated prepregs, and the prepregs are made from the polyphenylene ether resin composition.

7. The copper clad laminate of claim 6, wherein the copper foil is electrolytic copper foil or rolled copper foil, of which the surface roughness is less than 5 μm; the copper foil is chemically processed with silane couple agent that is one or a mixture of more selected from epoxy group silane couple agent, ethenyl silane couple agent and acrylate group silane couple agent.

8. The polyphenylene ether resin composition of claim 1, wherein the content of 1,2-addition butadienyl in the molecule of the olefin resin of the component (B) is not less than 70 wt %.

* * * * *